(12) United States Patent
Oh et al.

(10) Patent No.: US 12,536,766 B2
(45) Date of Patent: Jan. 27, 2026

(54) OBJECT EXTRACTION METHOD AND OBJECT EXTRACTION SYSTEM USING THE SAME

(71) Applicants: Hyundai Motor Company, Seoul (KR); Kia Corporation, Seoul (KR)

(72) Inventors: Se Do Oh, Seoul (KR); You Jin Shin, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 502 days.

(21) Appl. No.: 17/942,662

(22) Filed: Sep. 12, 2022

(65) Prior Publication Data
US 2023/0237761 A1 Jul. 27, 2023

(30) Foreign Application Priority Data
Jan. 27, 2022 (KR) ........................ 10-2022-0012468

(51) Int. Cl.
| | | |
|---|---|---|
| *G06T 7/50* | (2017.01) | |
| *G06T 3/40* | (2024.01) | |
| *G06T 3/60* | (2024.01) | |
| *G06T 7/13* | (2017.01) | |
| *G06V 10/20* | (2022.01) | |
| *G06V 10/422* | (2022.01) | |
| *G06V 10/44* | (2022.01) | |
| *G06V 10/46* | (2022.01) | |

(52) U.S. Cl.
CPC .............. *G06V 10/255* (2022.01); *G06T 7/50* (2017.01); *G06V 10/44* (2022.01); *G06T 2207/10028* (2013.01)

(58) Field of Classification Search
CPC .... G06V 10/255; G06V 10/44; G06V 10/422; G06T 7/50; G06T 2207/10028; G06T 7/13
See application file for complete search history.

(56) References Cited

U.S. PATENT DOCUMENTS

| | | | |
|---|---|---|---|
| 2020/0211197 A1* | 7/2020 | Zhang | .................... G06T 7/593 |
| 2021/0142497 A1* | 5/2021 | Pugh | ...................... G06T 7/194 |
| 2021/0358132 A1* | 11/2021 | Liu | .............. G06T 5/70 |
| 2022/0036514 A1* | 2/2022 | Niu | ........................ G06T 5/73 |
| 2022/0351478 A1* | 11/2022 | Zhang | .................... G06T 15/20 |

FOREIGN PATENT DOCUMENTS

| | | | | |
|---|---|---|---|---|
| CN | 112396664 A * | 2/2021 | ............. | G01S 17/86 |
| JP | 5759133 B2 * | 8/2015 | | |
| KR | 101936919 B1 * | 4/2019 | | |
| WO | WO-2014072926 A1 * | 5/2014 | .............. | G06T 7/13 |
| WO | WO-2021114884 A1 * | 6/2021 | ............. | G06T 17/20 |

* cited by examiner

*Primary Examiner* — John Villecco
*Assistant Examiner* — Kyla Guan-Ping Tiao Allen
(74) *Attorney, Agent, or Firm* — Fox Rothschild LLP

(57) ABSTRACT

An object extraction method using an object extraction system that includes a pre-processing module, an edge module, and an optimization module, and the object extraction method includes: generating an edge depth map with respect to a 2D image by pre-processing a 2D image where a target object to be data-labeled may be included, by the pre-processing module; extracting a target edge with respect to the target object from 3D data where the target object may be included, by the edge module; and optimizing the generated target edge to a final edge to match the generated edge depth map, by the optimization module.

13 Claims, 3 Drawing Sheets

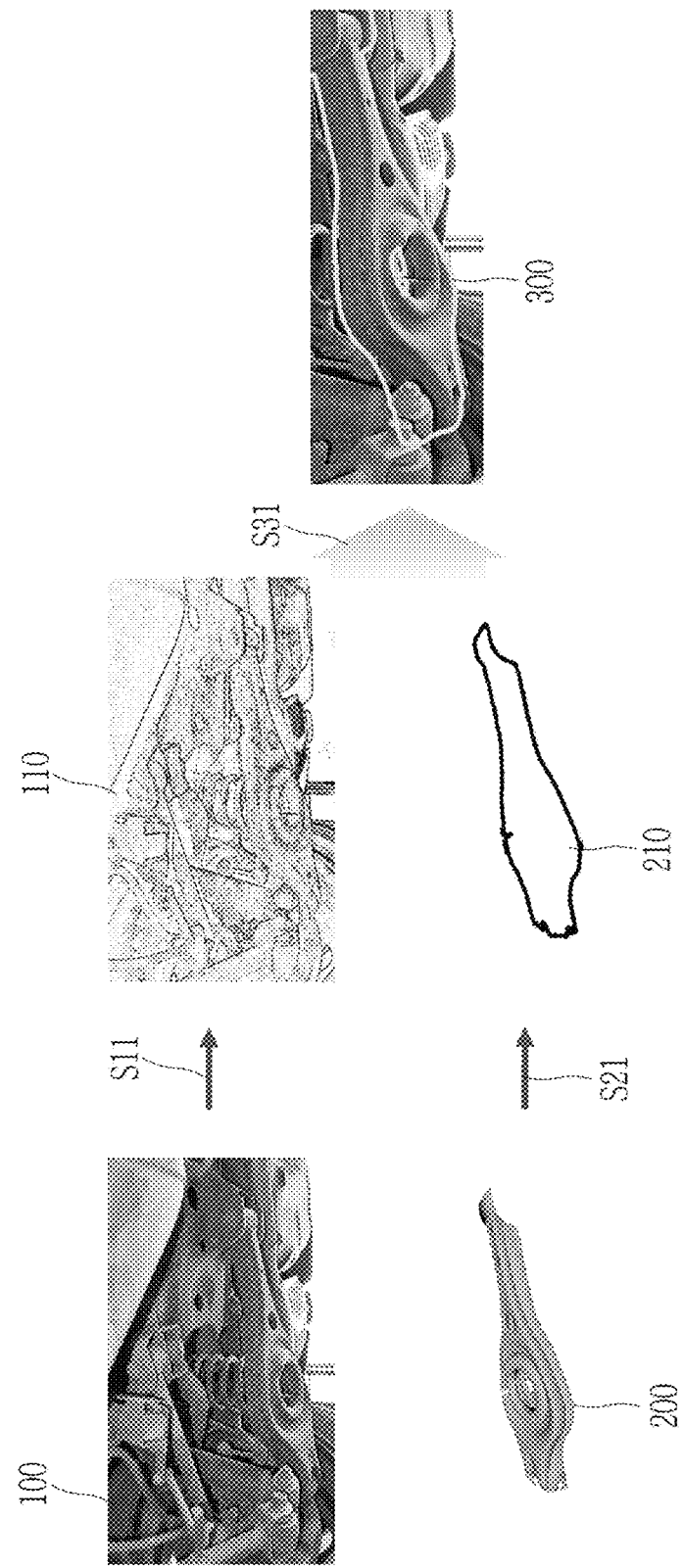

OBJECT EXTRACTION METHOD AND OBJECT EXTRACTION SYSTEM USING THE SAME

CROSS-REFERENCE TO RELATED APPLICATION

This application claims under 35 U.S.C. § 119(a) priority to and the benefit of Korean Patent Application No. 10-2022-0012468 filed in the Korean Intellectual Property Office on Jan. 27, 2022, the entire contents of which are incorporated herein by reference.

BACKGROUND OF THE DISCLOSURE

(a) Field of the Disclosure

The present disclosure relates to an object extraction method and an object extraction system using the same.

(b) Description of the Related Art

To create artificial intelligence (AI) learning data, data labeling work may be required to label source data. Segmentation may be a deep learning algorithm to find the shape of an object. In order to learn the segmentation of an object, labeling work may be required according to the shape of the object. In the past, the labeling work was done in such a way that a person separates an edge of an object by hand, but according to the existing method, it takes a lot of time and often errors occur, and thus there may be a need for efficient labeling work.

The above information disclosed in this Background section may be only for enhancement of understanding of the background of the disclosure, and therefore it may contain information that does not form the prior art that is already known in this country to a person of ordinary skill in the art.

SUMMARY OF THE DISCLOSURE

The technical object to be achieved by the present disclosure may be to provide a method and system that extracts an edge of an object included in an image, and enables labeling work suitable for the shape of the object.

An object extraction method according to one embodiment of the present disclosure uses an object extraction system that includes a pre-processing module, an edge module, and an optimization module, and the object extraction method includes: generating an edge depth map with respect to a 2D image by pre-processing a 2D image where a target object to be data-labeled may be included, by the pre-processing module; extracting a target edge with respect to the target object from 3D data where the target object may be included, by the edge module; and optimizing the generated target edge to a final edge to match the generated edge depth map, by the optimization module.

The generating the edge depth map may include: detecting a plurality of edges with respect to the 2D image, by the pre-processing module; and generating an edge depth map in which a probability that a plurality of edges will appear for each pixel included in the 2D image may be calculated, by the pre-processing module.

The detecting the plurality of edges may include: setting a predetermined number of different parameter values corresponding to one edge extraction algorithm with respect to the 2D image, by the pre-processing module; and detecting the predetermined number of edges by inputting the predetermined number of parameter values to the edge extraction algorithm, by the pre-processing module.

The detecting the plurality of edges may include: setting a predetermined number of different parameter values corresponding to each of two or more edge extraction algorithms with respect to the 2D image, by the pre-processing module; detecting a first predetermined number of edges by inputting values of the first predetermined number of parameters corresponding to any one of the two or more edge extraction algorithms, by the pre-processing module; and detecting a second predetermined number of edges by inputting values of the second predetermined number of parameters corresponding to another one of the two or more edge extraction algorithms, by the pre-processing module.

The optimizing may include applying an optimization algorithm that minimizes a cost function value to which the edge depth map and the target edge may be input, by the optimization module.

The optimizing may further include detecting a parameter that minimizes the cost function value as a result value by repeatedly performing correction of each enlargement, reduction, rotation, and movement parameter for the target edge, by the optimization module.

The object extraction method may further include detecting the target edge to which the parameter that minimizes the cost function value as the final edge by the optimization module.

The object extraction method may further include extracting a shape of the target object from the 2D image by applying the final edge to the 2D image, by the optimization module.

The object extraction system may further include a communication module, and the object extraction method may further include receiving the 2D image and the 3D data from an external device, by the communication module.

An object extraction system according to another embodiment of the present disclosure includes: a pre-processing module that generates an edge depth map with respect to a 2D image where a target object to be data-labeled may be included; an edge module that extracts a target edge with respect to the target object from 3D data where the target object may be included; and an optimization module that optimizes the generated target edge to a final edge to match the generated edge depth map.

The edge depth map may be generated by setting a predetermined number of different parameter values corresponding to one edge extraction algorithm with respect to the 2D image, detecting a predetermined number of edges by respectively inputting the predetermined number of parameter values to one edge extraction algorithm, and calculating a probability that a plurality of edges will appear for each pixel included in the 2D image, by the pre-processing module.

The edge depth map may be generated by setting a predetermined number of different parameter values corresponding to two or more edge extraction algorithms with respect to the 2D image, detecting a plurality of edges by respectively inputting the predetermined number of parameter values to the two or more edge extraction algorithms, and calculating a probability that a plurality of edges will appear for each pixel included in the 2D image, by the pre-processing module.

The optimization module may detect the final edge that optimizes the target edge by applying an optimization algorithm that minimizes a cost function value, and an input of the cost function may include the edge depth map and the target edge.

The optimization algorithm may find a parameter that minimizes the cost function value by repeatedly performing correction of each enlargement, reduction, rotation, and movement parameter for the target edge.

The optimization module may detect the target edge to which the parameter that minimizes the cost function value as the final edge, and extract a shape of the target object from the 2D image by applying the final edge to the 2D image.

The object extraction system may further include a communication module that receives the 2D image and the 3D data from an external device.

A non-transitory computer-readable recording medium having stored thereon a program for performing an object extraction method according to one embodiment of the present disclosure uses an object extraction system that includes a pre-processing module, an edge module, and an optimization module, and the method includes: generating an edge depth map with respect to a 2D image by pre-processing a 2D image where a target object to be data-labeled may be included, by the pre-processing module; extracting a target edge with respect to the target object from 3D data where the target object may be included, by the edge module; and optimizing the generated target edge to a final edge to match the generated edge depth map, by the optimization module.

According to the present disclosure, data labeling may be possible based on 3D data in a large amount of labeling work for predicting the shape of an object included in an image, and effective deep learning may be possible by reducing the time required for labeling a large amount of data, and the correct answer information required for deep learning in the future may be automatically generated.

In a further embodiment, a vehicle is provided that comprises or uses one or more object detection using the machine learning and data labeling according to exemplary embodiments as described herein.

BRIEF DESCRIPTION OF THE DRAWINGS

FIG. 3 illustrates an example of the object extraction method according to the embodiment.

DETAILED DESCRIPTION OF THE EMBODIMENTS

Figure 1:
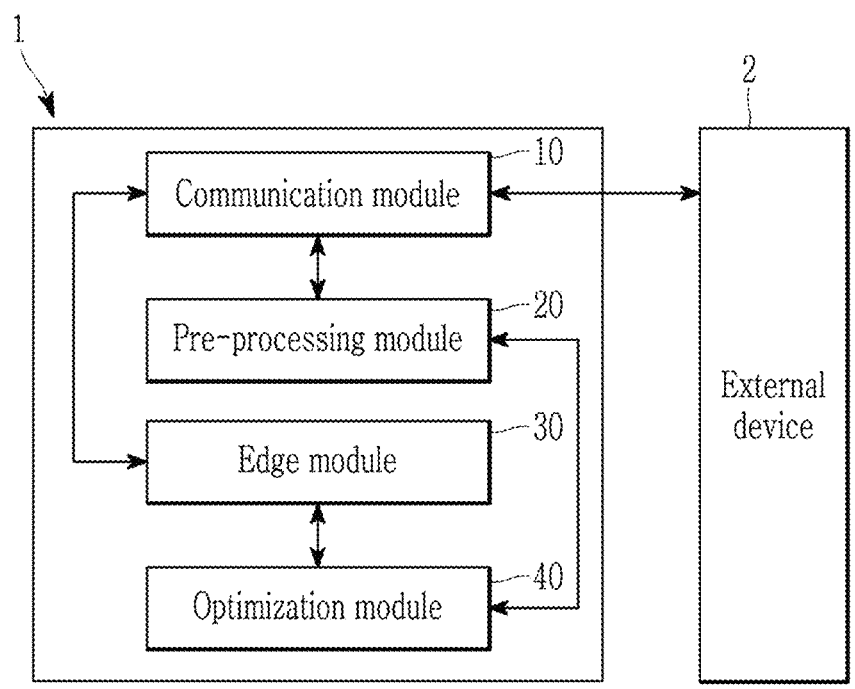
FIG. 1 is a block diagram of a configuration of an object extraction system according to an embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, referring to the drawings, embodiments disclosed in the present specification will be described in detail, but the same or similar constituent elements may be given the same and similar reference numerals, and overlapping descriptions thereof will be omitted. The suffixes "module" and/or "portion" for the constituent element used in the following description may be given or mixed in consideration of only the ease of specification writing, and do not have distinct meanings or roles by themselves. In addition, in describing the embodiment disclosed in the present specification, when it may be determined that a detailed description of a related known technology may obscure the gist of the embodiment disclosed in this specification, the detailed description may be omitted. In addition, the attached drawings may be only for easy understanding of the embodiment disclosed in the present specification, and the technical idea disclosed in this specification may not be limited by the attached drawings, and all changes included in the spirit and technical range of the present disclosure should be understood to include equivalents or substitutes.

Terms including ordinal numbers such as first, second, and the like may be used to describe various configurations elements, but the constituent elements may not be limited by the terms. The terms may be used only for the purpose of distinguishing one constituent element from another constituent element.

In the present application, terms such as "comprise" or "have" may be intended to designate that a feature, number, step, operation, constituent element, part, or combination thereof described in the specification exists, and it should be understood as not precluding the possibility of the presence or addition of and one or more other features, numbers, steps, actions, constituent elements, parts, or combinations thereof.

In the configuration for controlling another configuration in a specific control condition among configurations according to an embodiment, a program implemented as a set of instruction words embodying a control algorithm necessary to control another configuration may be installed. The control configuration may generate output data by processing input data and stored data according to the installed program. The control configuration may include a non-volatile memory to store programs and a memory to store data.

Hereinafter, in FIG. 1 to FIG. 3, an object extraction system and a method for extracting a shape of an object required for segmentation learning through labeling of a two-dimensional image will be described.

FIG. 1 is a block diagram of a configuration of an object extraction system according to an embodiment.

An object extraction system 1 may extract a shape of an object included in a 2D image and 3D data based on the 2D image and 3D data. The object extraction system 1 may include a communication module 10, a pre-processing module 20, an edge module 30, and an optimization module 40.

A 2D image and a 3D image may include the shape of the same target object. The target object may be an object for data labeling among objects included in the 2D image. For example, a 2D image may be a photo including a target object, and 3D data may be a 3D drawing including a target object.

The communication module 10 receives information necessary for target object extraction from an external device 2 or transmits a control instruction to the external device 2 according to the control of the pre-processing module 20, the edge module 30, and the optimization module 40 through a wired/wireless network. For example, the communication module 10 may receive 2D image and 3D data from the external device 2 and transmit it to the pre-processing module 20 and the edge module 30. The external device 2 may transmit the 2D image and the 3D data to the communication module 10 and receive the shape of the target object extracted from the object extraction system 1 through the communication module 10. Hereinafter, it has been described that the 2D image and the 3D data may be received from an external device through the communication module 10, but this may be for convenience of description, and the 2D image and the 3D data may be stored in a database.

The external device 2 may be at least one device including at least one of an input portion such as a camera and an output portion such as a display.

The pre-processing module 20 may pre-process the 2D image to generate an edge depth map. The edge module 30 may extract a target edge for a portion corresponding to a target object among 3D data from 3D data. The optimization module 40 may optimize the extracted target edge as a final edge to match the edge depth map. A part of 3D data corresponding to a target object may be hereinafter referred to as a 3D object.

The pre-processing module 20 may generate an edge depth map by applying a depth map-based edge detection method to the 2D image received through the communication module 10.

In the embodiment, the pre-processing module 20 applies the depth map-based edge detection method to the 2D image, and generates an edge depth map including the probability of the appearance of the edge of the 2D image.

The depth map-based edge detection method may be a method in which a plurality of edges may be detected for each pixel in a 2D image through an edge extraction algorithm, and the frequency of appearance of each of the detected plurality of edges may be expressed as a probability. The extraction algorithm may be an edge extraction algorithm such as Sobel, Prewitt, Roberts, log, zerocross, Canny, approxcanny, and the like.

The pre-processing module 20 may detect a plurality of edges by changing parameters through one edge extraction algorithm. The pre-processing module 20 may set a value of a parameter corresponding to one edge extraction algorithm to a predetermined number of different values. The pre-processing module 20 may detect a predetermined number of edges by inputting a predetermined number of parameter values to one edge extraction algorithm.

Alternatively, the pre-processing module 20 may detect a plurality of edges by changing parameters through two or more edge extraction algorithms. The pre-processing module 20 may set the value of the parameter corresponding to each of two or more edge extraction algorithms to a predetermined number of different values. The pre-processing module 20 may detect a plurality of edges by inputting values of a predetermined number of parameters corresponding to each of two or more edge extraction algorithms. Here, the parameter may indicate a different value for each edge extraction algorithm. Here, the predetermined number may be different for each edge extraction algorithm. For example, the pre-processing module 20 may detect a first predetermined number of edges by inputting values of the first predetermined number of parameters corresponding to any one of the two or more edge extraction algorithms, and may detect a second predetermined number of edges by inputting values of the second predetermined number of parameters corresponding to another one of the two or more edge extraction algorithms.

With respect to the detected plurality of edges, the pre-processing module 20 may generate an edge depth map based on the plurality of edges in the 2D image. The pre-processing module 20 may generate an edge depth map in which a probability that a plurality of edges will appear for each pixel included in the 2D image may be calculated. The pre-processing module 20 may calculate a probability of an edge appearing for each pixel in the 2D image according to a cumulative average or Gaussian distribution of the appearance probability of the edge.

Since a result of each extraction algorithm may be detected differently depending on a parameter set, a texture of the 2D image, and a noise increase, the pre-processing module 20 may generate an edge depth map by using all of the parameter sets of the plurality of extraction algorithms when the plurality of extraction algorithms may be combined.

The edge depth map may be expressed as an edge appearance probability calculated for each pixel included in the 2D image. For example, the pre-processing module 20 may generate an edge depth map including 400*400 probability values for a 2D image of 400*400 pixels.

The edge module 30 may extract a target edge of a target object by rendering with respect to the 3D data received through the communication module 10.

The edge module 30 may extract the target edge of the 3D object by rendering such that the target object included in the 3D data may be expressed on a two-dimensional screen.

The optimization module 40 may optimize a final edge to match the edge depth map generated in the pre-processing module 20 by applying an optimization algorithm to the target edge extracted from the edge module 30.

The optimization algorithm may be an algorithm that allows the generated edge depth map and the extracted target edge to be matched to the generated edge depth map by enlarging, reducing, rotating, and moving the target edge such that a cost function value may be minimized. Parameters used in the optimization algorithm may be formed of parameters involved in each of enlargement, reduction, rotation, and movement of the target edge.

The optimization module 40 repeatedly performs correction of enlargement, reduction, rotation, and movement parameters for the target edge until a stop condition may be satisfied for the extracted target edge. The optimization module 40 may find the optimal parameter while evaluating whether the target edge matches the edge depth map by repeating the correction of the parameter.

The optimization algorithm may be a greedy search-based algorithm. For example, since edge matching according to the embodiment may be a non-convex problem, the optimization module 40 may use a multi-start greedy algorithm using a distributed processing as an optimization algorithm. In addition, the optimization module 40 may reflect the diversity of parameter transformation order by using a Powell's method, which may be a variant of univariate search that separates and optimizes the axes of each parameter with a local search algorithm used at each distribution point. For example, the optimization module 40 may determine the transformation order of parameters for the x, y, and z axes as movement after rotation on the x-axis, movement after rotation on the y-axis, and movement after rotation on the z-axis.

The optimization algorithm may detect a parameter that may minimize the cost function value as a result value. An edge depth map and a target edge may be input to the cost function.

Referring to Equation 1, a cost function value may be detected.

$$\text{cost}(\theta_{xyz}, \rho_{xyz}, s) = -(y^*\log(p) + (1-y)^*\log(1-p)) + k\_\text{penalty} \quad \text{(Equation 1)}$$

Herein, k_penalty denotes a weight value of a cost function, $\theta_{xyz}$ denotes rotation angle of the x, y, and z axes of an object edge, $\rho_{xyz}$ denotes a parallel translation degree of the target edge on the x, y, and z axes, s denotes an enlargement or reduction scale of the target edge, y denotes a target edge function of a 3D object, and p denotes a probability value of the edge depth map. Parameters may be $\theta_{xyz}$, $\rho_{xyz}$, and s. The target edge function y of the 3D object may be expressed as $y(\theta x_{xyz}, \rho_{xyz}, s)$.

The weight value of the cost function may be predetermined with initial information, and then adjusted.

When the cost function value fluctuates within a predetermined range, the optimization algorithm counts the number of fluctuations, and when the fluctuation counts reaches a predetermined threshold count, the optimization algorithm determines that a stop condition may be achieved and stops the iteration, and may detect a parameter representing the minimum cost among the cost function values from the start time of the optimization algorithm execution to the stop point as the result value. Alternatively, the optimization algorithm sets a recent cost function value and the previous cost function value as a specific parameter ε, and when the parameter becomes zero or reaches below a predetermined threshold value, may detect a parameter representing the minimum cost among the cost function values from the start of the optimization algorithm execution to the time of stopping as the result value. Alternatively, when the value of the cost function reaches below a predetermined threshold cost, the optimization algorithm considers that the stopping condition has been achieved and stops the iteration, and may detect a parameter representing the minimum cost among the cost function values from the start of the optimization algorithm execution to the time of stopping as the result value.

The optimization module 40 may determine the target edge to which the result value detected from the optimization algorithm may be applied as a parameter as the final edge.

The optimization module 40 may extract the shape of the target object from the 2D image by applying the final edge to the 2D image.

The shape of the target object extracted from optimization module 40 may be used as a label for the 2D image to generate artificial intelligence learning data.

Figure 2:
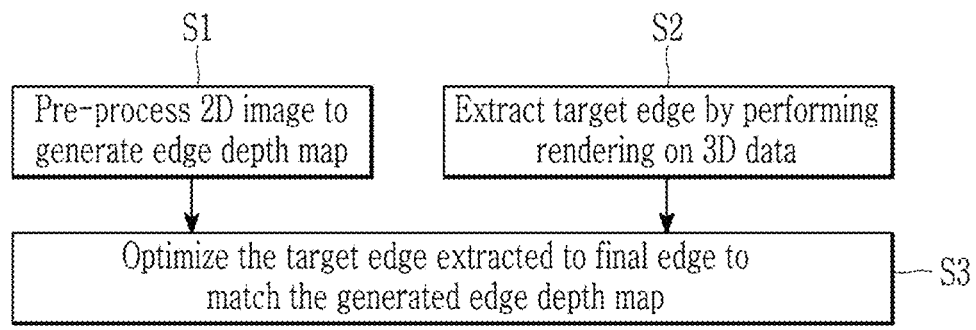
FIG. 2 is a flowchart of an object extraction method according to the embodiment.

FIG. 2 is a flowchart of an object extraction method according to the embodiment.

The pre-processing module 20 may pre-process a 2D image to generate an edge depth map (S1).

The communication module 10 may transmit the received 2D image to the pre-processing module 20. The pre-processing module 20 may transmit the generated edge depth map to the optimization module 40.

The edge module 30 may extract a target edge by performing rendering with respect to 3D data (S2).

The communication module 10 may transmit the received 3D data to the edge module 30. The edge module 30 may transmit the target edge of the generated target object to the optimization module 40.

The optimization module 40 may optimize the target edge extracted by applying the optimization algorithm to the final edge to match the generated edge depth map (S3).

The optimization module 40 may extract the shape of the target object from the 2D image by applying the determined final edge to the 2D image. The optimization module 40 may transmit the shape of the target object extracted from the 2D image to the external device 2 through the communication module 10.

FIG. 3 illustrates an example of the object extraction method according to the embodiment.

The 2D image 100 received through the communication module 10 may include various objects. For example, the object may be a vehicle part. In addition, the 3D data 200 received through the communication module 10 may include a target object among objects included in the 2D image 100.

The pre-processing module 20 may generate an edge depth map 110 to extract an edge from the 2D image 100

(S11). The edge depth map 110 may represent relative depths of pixels included in the 2D image 100 in grayscale.

The edge module 30 may extract the target edge 210 for the target object from the 3D data 200 (S21).

The optimization module 40 applies an optimization algorithm to generate a final edge where the target edge 210 of the target object may be optimized to the edge depth map 110 (S31).

The optimization module 40 may apply the final edge to the 2D image 100. An image 300 shows the final edge matched to the 2D image 100.

According to the embodiment, it may be possible to reduce the man-hours required for data labeling by automatically labeling objects for 2D images based on 3D data. In addition, edge consistency problems may be reduced by using the edge depth map and 3D data. The edge consistency problem may indicate that sizzling occurs at the edge due to lack of labeling training data or the texture or noise of the picture.

While this disclosure has been described in connection with what may be presently considered to be practical embodiments, it may be to be understood that the disclosure may not be limited to the disclosed embodiments. On the contrary, it may be intended to cover various modifications and equivalent arrangements included within the spirit and scope of the appended claims.

DESCRIPTION OF SYMBOLS

The following numbers correspond to the following objects:
1: object extraction system
10: communication module
20: pre-processing module
30: edge module
40: optimization module
2: external device
100: 2D image
110: Edge Depth Map
200: 3D data
210: target edge
300: image

What is claimed is:

1. An object extraction method, comprising:
generating, by a processor, an edge depth map with respect to a 2D image by pre-processing a 2D image where a target object to be data-labeled is included;
extracting, by the processor, a target edge with respect to the target object from 3D data where the target object is included; and
optimizing, by the processor, the generated target edge to a final edge to match the generated edge depth map;
wherein the optimizing comprises applying, by the processor, an optimization algorithm that minimizes a cost function value to which the edge depth map and the target edge are input;
wherein the optimizing further comprises, by the processor, detecting a parameter that minimizes the cost function value as a result value by repeatedly performing correction of each enlargement, reduction, rotation, and movement parameter for the target edge.

2. The object extraction method of claim 1, wherein the generating the edge depth map comprises:
detecting, by the processor, a plurality of edges with respect to the 2D image; and
generating, by the processor, the edge depth map in which a probability that a plurality of edges will appear for each pixel included in the 2D image is calculated.

3. The object extraction method of claim 2, wherein the detecting the plurality of edges comprises:
setting, by the processor, a predetermined number of different parameter values corresponding to an edge extraction algorithm with respect to the 2D image; and
detecting, by the processor, a predetermined number of edges by inputting the predetermined number of parameter values to the edge extraction algorithm.

4. The object extraction method of claim 2, wherein the detecting the plurality of edges comprises:
setting, by the processor, a predetermined number of different parameter values corresponding to each of two or more edge extraction algorithms with respect to the 2D image;
detecting, by the processor, a first predetermined number of edges by inputting values of a first predetermined number of parameters corresponding to any one of the two or more edge extraction algorithms; and
detecting, by the processor, a second predetermined number of edges by inputting values of a second predetermined number of parameters corresponding to another one of the two or more edge extraction algorithms.

5. The object extraction method of claim 1, further comprising
detecting, by the processor, the target edge to which the parameter that minimizes the cost function value as the final edge.

6. The object extraction method of claim 5, further comprising, by the processor, extracting a shape of the target object from the 2D image by applying the final edge to the 2D image.

7. The object extraction method of claim 1, wherein
the object extraction method further comprises, by the processor, receiving the 2D images and the 3D data from an external device.

8. A non-transitory computer-readable recording medium having stored thereon programs for performing the method of claim 1.

9. An object extraction system comprising:
a memory configured to store programs; and
processor configured to, in accordance with the programs:
generate an edge depth map with respect to a 2D image where a target object to be data-labeled is included;
extract a target edge with respect to the target object from 3D data where the target object is included;
optimize the generated target edge to a final edge to match the generated edge depth map, and
detect the final edge that optimizes the target edge by applying an optimization algorithm that minimize a cost function value,
wherein an input of the cost function comprises the edge depth map target edge; and
wherein the optimization algorithm finds a parameter that minimizes the cost function value by repeatedly performing correction of each enlargement, reduction, rotation, and movement parameter for the target edge.

10. The object extraction system of claim 9, wherein the processor generates the edge depth map by:
setting a predetermined number of different parameter values corresponding to an edge extraction algorithm with respect to the 2D image, detecting a predetermined number of edges by respectively inputting the predetermined number of parameter values to one edge extraction algorithm, and calculating a probability that a plurality of edges will appear for each pixel included in the 2D image.

11. The object extraction system of claim 9, wherein the processor generates the edge depth map by:

setting a predetermined number of different parameter values corresponding to two or more edge extraction algorithms with respect to the 2D image, detecting a plurality of edges by respectively inputting the predetermined number of parameter values to the two or more edge extraction algorithms, and calculating a probability that the plurality of edges will appear for each pixel included in the 2D image.

12. The object extraction system of claim 9, wherein the processor is further configured to receive the 2D image and the 3D data from an external device.

13. An object extraction system comprising:

a memory configured to store programs; and processor configured to, in accordance with programs:

generate an edge depth map with respect to a 2D image where a target object to be data-labeled is included;

extract a target edge with respect to the target object from 3D data where the target object is included;

optimize the generated target edge to a final edge to match the generated edge depth map;

wherein the optimizing further comprises applying an optimization algorithm to find a parameter that minimizes a cost function value by repeatedly performing correction of each enlargement, reduction, rotation, and movement parameter for the target edge;

detect the target edge to which the parameter that minimizes the cost function value as the final edge, and extract a shape of the target object from the 2D image by applying the final edge to the 2D image.

* * * * *